United States Patent [19]
Evans

[11] 3,931,658
[45] Jan. 13, 1976

[54] WASHING APPARATUS FOR VEHICLES

[76] Inventor: Lyle B. Evans, 3520 SW. 108th Ave., Beaverton, Oreg. 97005

[22] Filed: Nov. 11, 1974

[21] Appl. No.: 522,935

Related U.S. Application Data

[63] Continuation-in-part of Ser. No. 475,103, May 31, 1974, abandoned, which is a continuation-in-part of Ser. No. 386,976, Aug. 9, 1973, abandoned.

[52] U.S. Cl. ................ 15/4; 15/DIG. 2; 15/53 AB
[51] Int. Cl.² ........................................... B60S 3/06
[58] Field of Search ......... 15/DIG. 2, 4, 21 R, 21 C, 15/21 D, 21 E, 53, 97

[56] References Cited
UNITED STATES PATENTS

| | | | |
|---|---|---|---|
| 3,510,898 | 5/1970 | Tatara et al. | 15/97 R |
| 3,683,441 | 8/1972 | Fromme | 15/97 R |

FOREIGN PATENTS OR APPLICATIONS

| | | | |
|---|---|---|---|
| 1,480,412 | 8/1969 | Germany | 15/97 R |

*Primary Examiner*—Edward L. Roberts
*Attorney, Agent, or Firm*—James D. Givnan, Jr.

[57] ABSTRACT

A car wash apparatus having inner and outer, counter-rotating curtain assemblies of circular configuration. Each curtain comprises strip elements which at rest are suspended in close proximity to those strip elements of the other curtain. The strips are displaced during travel over the car body resulting in the strips from one curtain intermingling with strips of the other curtain to enhance the strips cleaning action. A drive mechanism powers the curtains through concentric drive shafts with a water supply shown provided through same. Curtain confining means are supported adjacent the curtain paths guiding the curtain strips for rotational travel into desired impingement against the vehicle body. The strip elements may include highly flexible fibrous segments to clean irregular surface areas of the vehicle. Rotary brushes within the inner curtain assembly clean the vehicle sides. Said brushes are powered via a continuous cable carried by said curtain assembly reeved through power take-off pulleys.

25 Claims, 17 Drawing Figures

WASHING APPARATUS FOR VEHICLES

BACKGROUND OF THE INVENTION

The present application is a continuation-in-part of my copending U.S. patent application bearing the same title filed May 31, 1974 under Ser. No. 475,103, now abandoned, which was a continuation-in-part of an original application filed Aug. 9, 1973 and accorded Ser. No. 386,976, now abandoned.

In common use presently are various apparatuses for the washing or cleaning of automobiles. Such apparatuses include both powered brushes and more recently, pliable strips which dislodge dirt from the vehicle by a wiping action. The term curtain is applied commonly to any suspended aggregation of pliable strip material that travels over the vehicle contours to clean same. Examples of the curtain type prior art are found in the following U.S. Pat. Nos. 3,705,435; 3,683,441; 3,517,405; 3,510,898; 3,499,180; 3,487,490; 3,345,666; and 2,544,066.

The prior art apparatuses commonly provide a curtain or curtains of pliable strips disposed crosswise to the automobile path with the curtain strips being oscillated or drawn across the automobile body in a unidirectional manner. The mechanism, for imparting such movements to the curtain, is complex and contributes to such being a costly piece of equipment not readily affordable by all car wash operators. The complexity of such curtain oscillating or powering mechanisms further results in a high incidence of component failures with the consequent shut down of the car wash apparatus until a replacement part is obtained or repairs made. While very large car wash establishments may be able to inventory a complete supply of parts and retain fully trained service personnel the same is not so for a smaller car wash operator, for example, a service station operator operating a car wash as an added service to his customers. The complex apparatuses of the prior art are clearly not practical from an original cost or maintenance standpoint in this type of operation.

Contributing to the impractical nature of the prior art equipment, in addition to original cost and maintenance objections, is the operating envelope or space required to install such equipment. Again, where the operation is primarily that of a service station, space for the installation of the car wash equipment is severely limited. In some instances the space available for car wash equipment will be limited to that area termed a bay which formerly was used as an auto servicing area.

SUMMARY OF THE INVENTION

The present invention is embodied within an apparatus having counter-rotating curtain assemblies with the circular curtains suspended therefrom having an augmented cleaning action by reason of the interaction of curtain strips while passing oppositely across auto surfaces in close proximity to one another. Concentric curtain supports are driven in opposite directions of rotation with their strip-like curtain elements trailing across the auto body. The travel of said strips in conjunction with continuous forward motion of the vehicle and the varying contour of same provides a resultant random passage of the strips over the auto body. Certain curtain elements of the inner and outer curtains are displaced by vehicle contact into an enmeshed relationship resulting in their paths being altered to further enhance their cleaning action on the surface. Additionally the rotating strip elements of the inner curtain assembly may urge those of the outer curtain assembly into forceful contact with the auto surfaces. Means are provided for concentric rotation of the curtains including a provision for delivery of water to at least one of said curtain assemblies. A supporting framework for the curtain supports may be mobile permitting relocation of the apparatus if the latter is used only periodically with the framework additionally serving, if desired, to support water and wax solution conduits. As the framework itself is of large diameter tubular components the same may serve as conduit means to supply spray outlets mounted thereon.

Curtain confining means, disclosed as panels in a later described modified form of the invention, are supported by the framework and constrain the curtain strips for arcuate travel into impingement against the vehicle body for optimum strip cleaning action on the body without risk of undue entanglement of said strips. Fabric segments carried by the strips as later described further enhance cleaning action.

Side brush assemblies are disposed within the inner curtain assembly and engage the vehicle sides to supplement the cleaning action of the curtain assemblies. The rocker panels of an auto being washed are also engaged by the side brushes to dislodge dirt thereon. Each brush assembly is powered by a rotating curtain assembly by means of a circuit of cable on the curtain assembly being reeved through power take-off pulleys in driving connection with each brush.

Important objectives achieved with the present car wash apparatus include: an apparatus having a thorough washing action; an apparatus of simplified construction resulting in a significantly lower original cost and an apparatus not susceptible to component failures; an apparatus having multiple counter-rotating circular curtains radially offset from one another with curtain confining means directing same into desired contact with the automobile body; and apparatus having multiple circular curtains with said curtains comprising strip elements bearing for a portion of its length a highly flexible, fibrous strip of a wooly appearance particularly adapted for cleaning irregular automobile surface areas; an apparatus having side brushes for cleaning the sides of a vehicle with each of the brushes deriving rotary power from the innermost rotating curtain assembly by means of a power take-off in driven engagement with continuous means carried by said inner curtain assembly; an apparatus wherein side brushes are laterally displaced upon a control arm being contacted by the approaching vehicle to preclude damage to the brushes by the vehicle; a car wash apparatus of a compact nature readily adaptable for use in other than primarily car wash installations, as for example, service station bays; an apparatus having low shipping, installation and hook-up costs permitting relocationing of the apparatus if so desired; an apparatus wherein undesirable curtain action, as for example whipping of end segments, is avoided thereby avoiding damage to automobiles and their accessories; an apparatus capable of operating within a relatively small area such as a bay of a service station; an apparatus wherein the framework is of relatively large diameter pipe to serve both as a water conduit and reservoir, the latter at a pressure considerably above normal line pressure of a standard sized supply conduit.

DETAILED DESCRIPTION OF THE PREFERRED EMBODIMENTS

With continuing reference to the drawings, wherein applied reference numerals indicate parts similarly identified in the following specification, the reference numeral 1 indicates generally a tubular support structure or framework of the present apparatus.

The support structure 1 is comprised of tubular members including pairs of leg members 2 with each pair interconnected by crossmembers 3. Interconnecting the crossmembers 3 are longitudinal members 4 which support a drive mechanism generally at 5.

The structural members being tubular may be utilized to convey water to supply nozzles 6 and 7 or alternatively, conduits may be provided exteriorly of said structural members. For the sake of convenience, caster wheels 8 are provided to enable rolled movement of the apparatus. Rods at 10 longitudinally interconnect the leg members bracing same.

CURTAIN ASSEMBLIES

Multiple curtain assemblies are provided with two being shown in the present embodiment of the invention, one disposed within the other and hence termed inner and outer curtain assemblies and indicated generally at 12 and 13. The curtain assemblies are similar to a large extent, each being circular, with the diameters differing to provide circular curtains C each offset or horizontally spaced from the outer but suspended in close proximity. Each curtain is of a later described fabric cut to provide highly flexible strip-like elements S.

Inner curtain assembly 12 includes a circular curtain ring or support 14 constituting a curtain support which may be of rolled angle stock. Radially disposed spars 15 terminate inwardly in bolted attachment (FIG. 5) with a carrier 16 flanged at 16A-16B. The carrier is secured to the lower end of an inner curtain drive shaft 54 by means of a shaft attached plate 17 with bolt assemblies 18 passing therethrough and through the carrier flanges and inner spar ends. Curtain ring 14 is additionally supported by a series of tensioned suspension cables 19 in adjustable engagement as at 20 with ring 14 and affixed by cable eyes at 21 to flange 16A of the carrier. While only two tensioned cable members 19 are shown (FIG. 5) associated with carrier 16, additional tensioned members are utilized and extend in a similar manner between carrier member 16 and the curtain support ring 14. To effectively impart drive shaft rotation to inner curtain assembly 12 the cable eyes 21 are secured to carrier flange 16A in a tangential manner with the attachment point being advanced ninety degrees in the direction of rotation from the point at which attachment would be made if the cable 19 were to lie in a true radial plane of carrier 16.

For distributing a water flow a union at 22 is in communication with a water source via the inner curtain drive shaft with the flow being directed to spray conduits 23 affixed to certain of the spars.

Outer curtain assembly 13 is similar to the first described curtain assembly and includes a circular curtain ring or support 26 of greater diameter than curtain ring 14 to outwardly space its curtain from the inner curtain assembly. Outer curtain assembly 13 further includes spars 27, a flanged carrier 28 bored to receive a tubular outer curtain drive shaft 30. Carrier 28 includes flanges 28A-28B the lowermost being in bolted engagement with the spars 27 while the upper flange receives the inner ends of tension cables 31. Upper flange 28A is additionally in bolted engagement with a plate 29 which is secured to and supported by shaft 30. As curtain rotation of the outer curtain assembly is counter to that of the inner curtain, the cable eyes at 32 are attached to flange 28A in an oppositely offset manner from those described earlier in connection with carrier 16.

Figure 9:
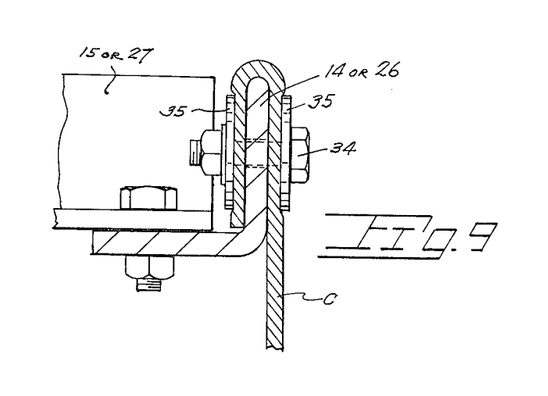
FIG. 9 is a sectional view of a typical curtain ring showing curtain attachment thereto.

The material used for the curtains may be of synthetic fiber of the type widely marketed by several manufacturers for use as outdoor carpeting, such material being well known in the car washing art with various other types of "curtain apparatuses. One such suitable material is sold under the trademark Ozite. The circular curtains are cut into strip form with each strip being approximately one and one half inches in width and extending substantially the vertical height of the curtain C. One suitable means for attaching the curtain material to its frame is shown in FIG. 9 wherein bolt assemblies 34 extend through the doubled back upper edge of the curtain and through the curtain ring 14 or 26 with washer elements 35 providing an adequate compression surface against the material. Desirably, each curtain is comprised of separately detachable segments of ninety degrees for convenient replacement when necessary.

Figure 5:
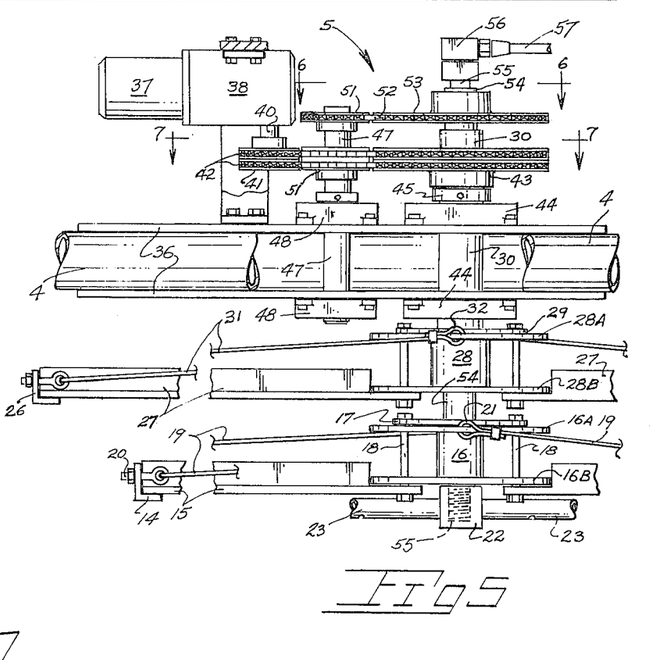
FIG. 5 is an elevational view of a drive mechanism for the inner and outer curtain assemblies of the apparatus.
Figure 6:
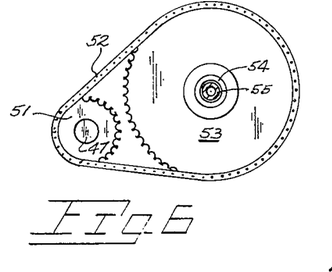
FIG. 6 is a horizontally sectional view taken downwardly along line 6—6 of FIG. 5 of the drive assembly.
Figure 7:
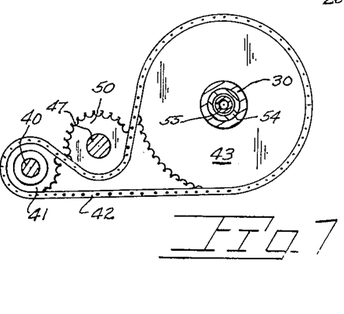
FIG. 7 is a view similar to FIG. 6 taken downwardly along line 7—7 disclosing other drive mechanism components.

As best viewed in FIGS. 5 through 7, the drive mechanism 5 is mounted on the longitudinal members 4 of the apparatus by means of plates 36. An electric motor 37 drives through a reduction gear box 38, the output shaft 40 of which carries a double roller chain sprocket 41 driving a double roller chain 42 which is entrained about a driven sprocket 43 for imparting torque to tubular drive shaft 30 powering the outer curtain assembly 13. Shaft 30 is suitably journalled within plate mounted bearings 44 while a collar 45 retains shaft 30 against axial movement. Shaft 30 terminates downwardly with carrier 28 as earlier described.

For imparting opposite rotation to inner curtain assembly 12 a shaft 47 is suitably journalled within plate mounted bearings 48. As viewed in FIG. 7, double roller chain 42 is reversely entrained about a sprocket 50 so as to impart rotation to shaft 47 oppositely to the rotation of sprocket 43 associated with the outer curtain assembly. For transmitting such opposite idler shaft rotation to inner curtain assembly 12, a driving sprocket 51 (FIG. 6) on idler shaft 47 drives a single roller chain 52 and in turn a driven sprocket 53, the last mentioned sprocket being keyed to an inner curtain assembly drive shaft indicated at 54 which additionally is keyed at its lower end to carrier 16 earlier described.

For supplying water to the inner curtain assembly 12, I provide a water conduit 55 for passage lengthwise of inner drive shaft 54. An inlet coupling at 56 receives water from a suitable pressurized source 57 with the lower half of the coupling being rotatable with water conduit 55 while union 22, at the lower end of the conduit, distributes the flow laterally to multiple spray conduits 23.

Figure 2:
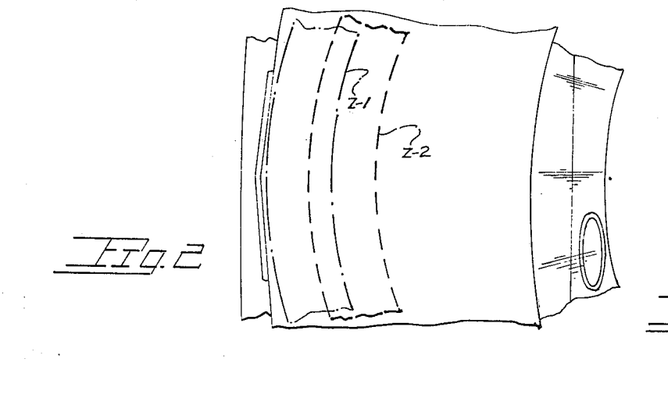
FIG. 2 is a plan view of the autos front portion with arcuate areas indicated schematically thereon typically indicating areas traversed by passing strip-like elements of the two curtain assemblies.
Figure 4:
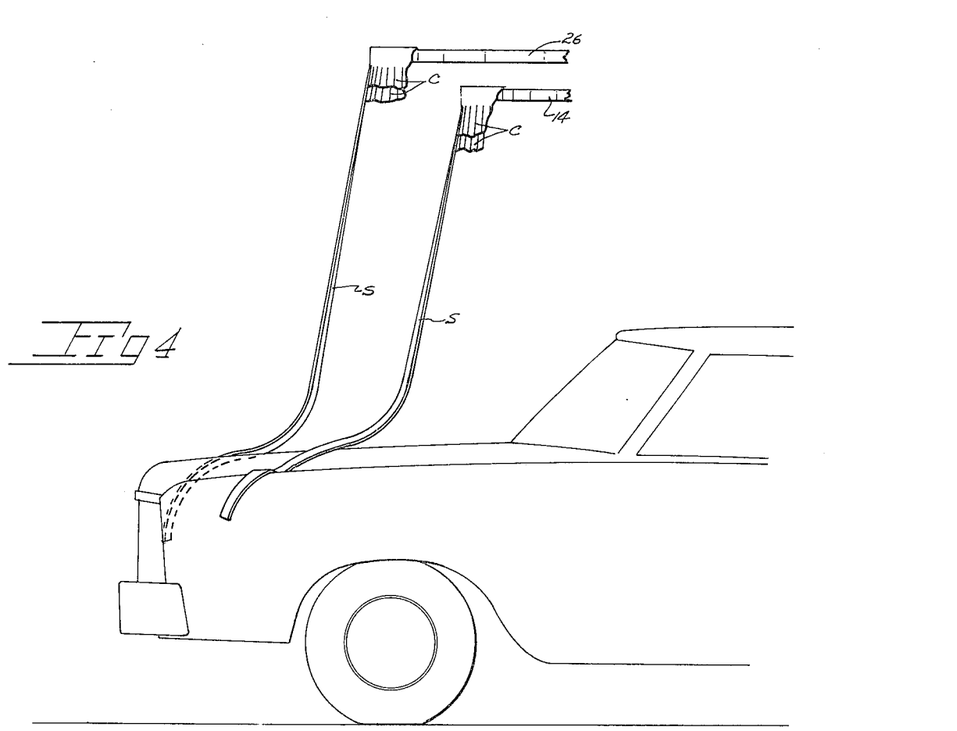
FIG. 4 is a side elevational view of the apparatus with curtain fragments broken away to disclose typical stripelements of the inner and outer curtains and their relationship during passage over auto surfaces.

Of particular importance in the present invention are the operational advantages of multiple, counter-rotating curtains moving in close proximity to one another and at times intermeshing with one another. With reference to FIGS. 2 and 4, it will be seen that curtain strips (typically shown in FIG. 4) travel across vehicle body surfaces with zones at Z-1 and Z-2 indicating areas of wiping contact by the oppositely moving strips. Common or overlapped areas of contact occur by reason of the inner strip trailing outwardly and rearwardly (with respect to its supporting ring 14) into the path of the oncoming strips of the outer curtain. It is believed obvious that the zones will be of a shape other than the arcuate areas indicated by reason of the random interaction of the oppositely passing strips and the forward motion of the vehicle. Further, enhancing the cleaning action of the strips is the tendency of the strips to override one another of the same and other curtain.

With attention to FIG. 8 wherein again only two typical curtain strips S are shown for the sake of clarity, strip cleaning action on the leading and trailing upright surfaces of a vehicle is particularly efficient by reason of concerted strip action. For example the front bumper and grill of the auto being washed are initially contacted by the outer curtain which normally travels in a downwardly flared configuration by reason of centrifugal force acting along the strip per the broken line position. The outer curtain strips, as they initially contact and sweep across the grillwork of the forwardly moving auto are gradually displaced to the full line position of FIG. 8 whereat the strips of the inner curtain impinge on same urging the outer curtain strips into more forceful contact with the upright auto surfaces. The same strip action occurs as the auto departs the curtain area of the apparatus achieving efficient cleaning of the autos rear deck, bumper and other upright rear end surfaces.

Figure 1:
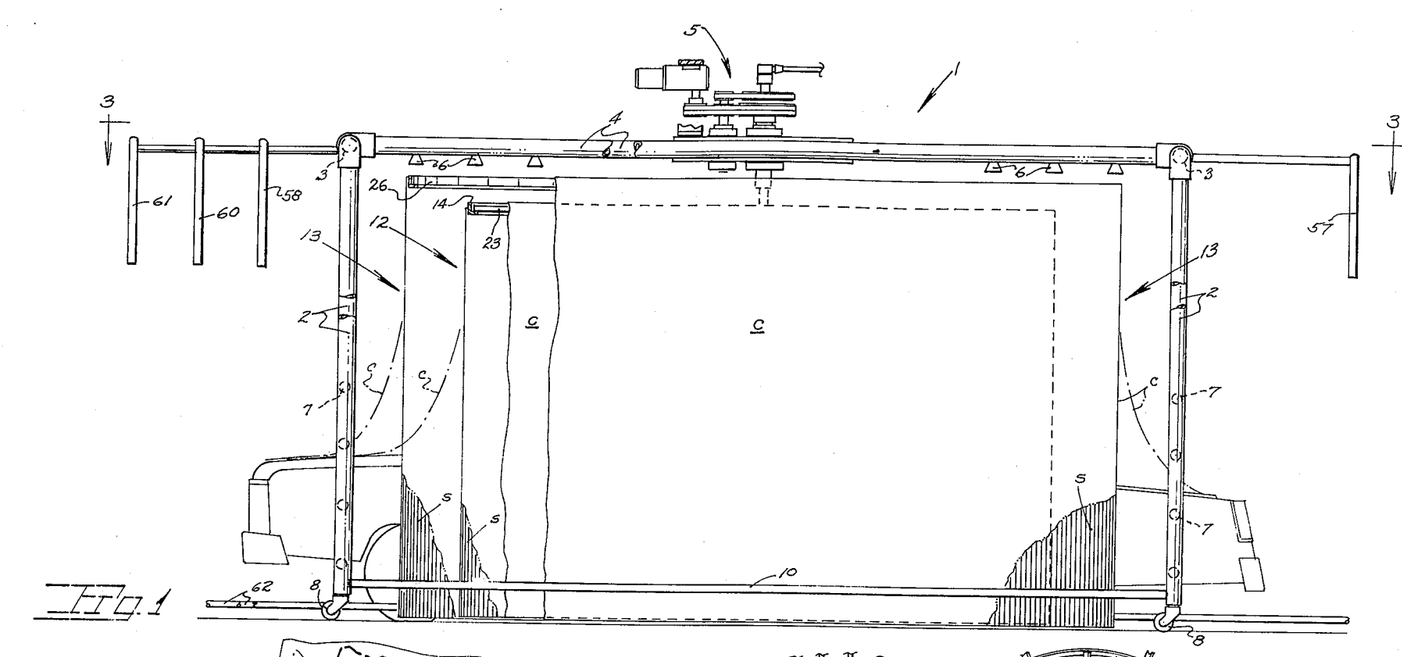
FIG. 1 is a side elevational view of the present apparatus at rest with curtain fragments broken away and the outermost limits of curtain travel during operation shown in broken lines.
Figure 3:
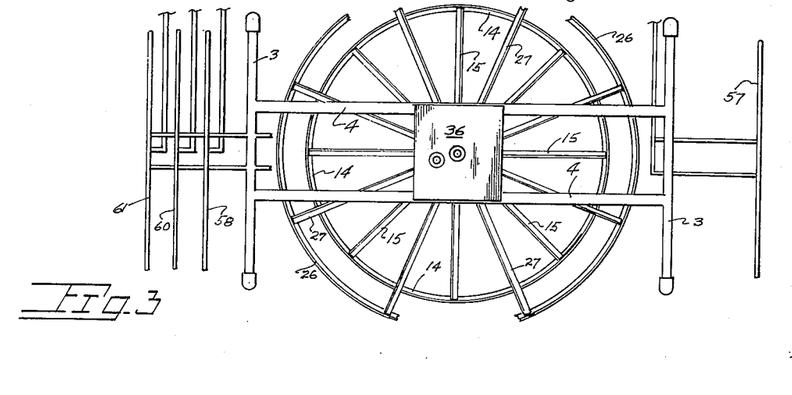
FIG. 3 is a plan view of the apparatus framework taken downwardly along line 3—3 of FIG. 1 and of reduced scale.

With attention again to FIGS. 1 and 3, the hollow tubular support structure 1 may receive a water flow for water nozzles 6 and 7 and be additionally equipped with additional water and liquid wax conduits to prepare the auto for curtain contact as well as to rinse same and to apply a wax solution. A first crosswise conduit or "wand" 57 suitably supported on structure 1 pre-soaps the car while frame mounted nozzles 6 and 7 apply additional water. Conduits 23, carried by inner curtain assembly 12, receive a constant flow of soap and water to thoroughly soap the vehicle during passage of the vehicle through the curtains. As the vehicle moves away from the curtain assemblies, rinse water is applied from the nozzles 7 at the left hand side of FIG. 1 while a frame supported "wand" at 58 delivers a water-wax solution. A "wand" at 60 discharges a chemical wax solution to lessen water "beading" while a "wand" at 61 applies the final rinse to the vehicle. The use of such "wands" in the car wash industry such being associated with other apparatuses and the solutions discharged thereby are all well known and constitute no part of the present invention.

For guidance of the auto through the curtain assemblies, guide rails at 62 may be spaced to receive the wheels along one side of the vehicle. For smaller than standard size vehicles a second pair of rails may be located inwardly toward the vertical axis of the curtain assemblies in order to direct the vehicle through the center of the curtain assemblies. Other known equipment may be associated with the present apparatus such as wheel washing and rocker panel washing instrumentalities.

Figure 10:
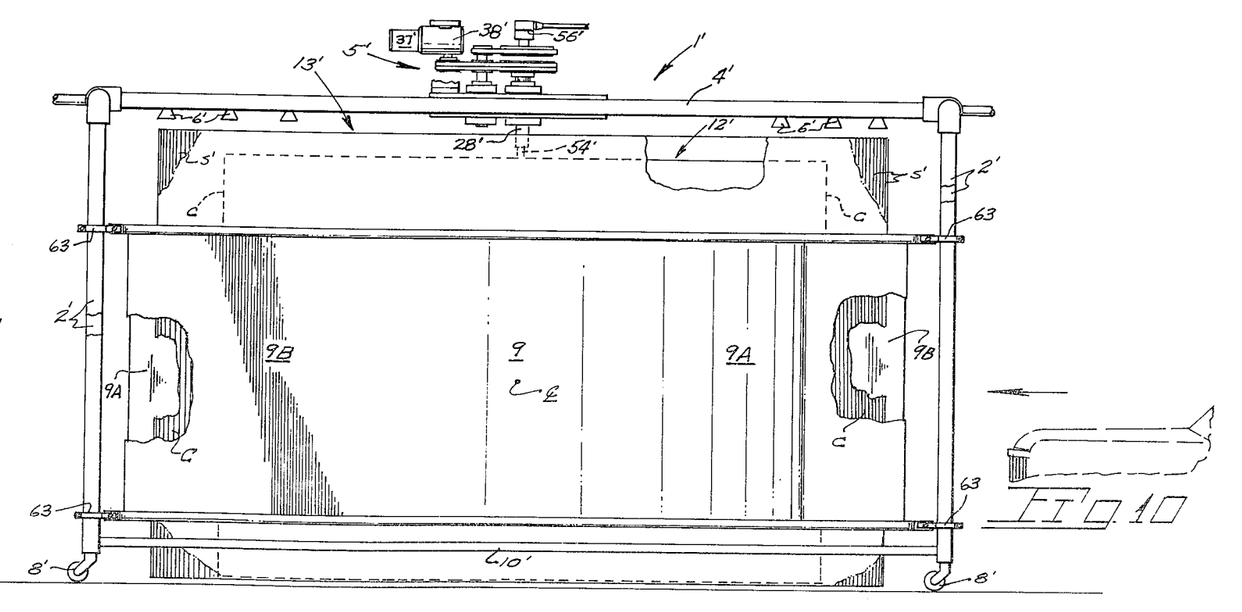
FIG. 10 is a view similar to FIG. 1 but with curtain confining means in place on the support structure.
Figures 11, 12:
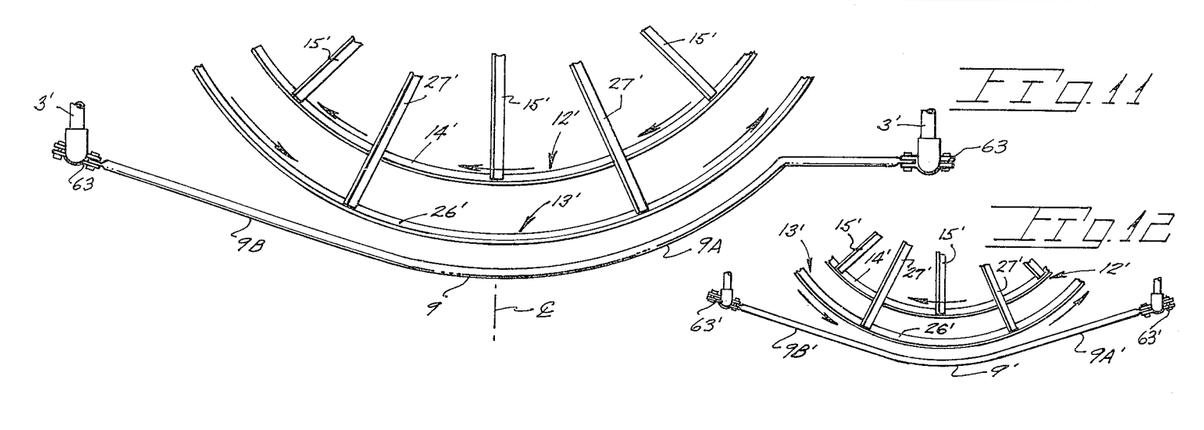
FIG. 11 is a plan view of the side of the support structure viewed in FIG. 10 with a curtain confining panel in place thereon.
FIG. 12 is a view similar to FIG. 11 but on a reduced scale showing modified panel configuration.

Shown supported by said leg members 2' in a modified form of the support structure in FIGS. 10, 11 and 12 (wherein aforementioned components are indicated by like prime reference numerals) are curved panels 9 offset from curtain assemblies 12' and 13' and constituting curtain confining means. Clamps at 63 serve to attach each panel corner to the framework leg members with the mid-portion of each panel being offset approximately 6 inches or so from the outermost curtain when at rest. Each of the curtain retainers serves to confine the strips of the curtain assemblies against excessive outward displacement during curtain rotation and more importantly, guides the moving curtain strips of the outer curtain assembly 13' into desired impingement with the automobile body to enhance the concerted action of the strips on said body. In FIGS. 10 and 11, the panels 9 include a curved portion 9A on one side of a transverse centerline CL said portion formed on a constant radius. A remaining portion 9B is tangential to portion 9A. Accordingly, and as best viewed in FIG. 11, the strips of the outer curtain assembly 13' departing from the automobile body are provided additional clearance to permit their gradual and progressive confinement by mid-portion 9 of the panel. With attention to FIG. 12 a slightly different panel configuration is shown wherein panel 9' has portions at 9A' and 9B' symmetrically disposed as viewed in the plan view provided. In this latter panel the strip-like curtain elements of outer curtain assembly 13 are not confined by panel portion 9A' to the extent provided by the earlier described panel portion 9A to reduce the concerted force exerted against the vehicle body by the aggregated strips. In FIGS. 10 through 12 the unseen panels 9, 9' are of like spacing and configuration as those shown at diametric points from the curtain axis.

Figure 13:
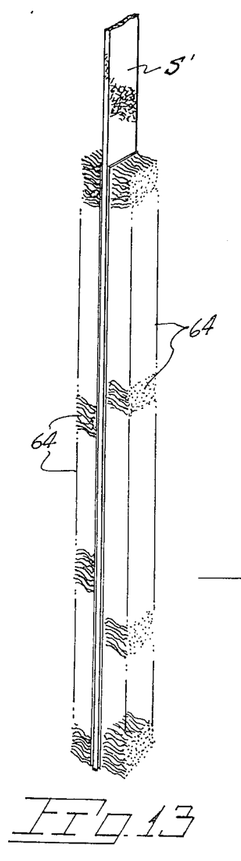
FIG. 13 is a perspective view of a modified curtain strip.

Shown in FIG. 13 is a modified form of curtain wherein each curtain strip S carries lengths at 64 of a fibrous material suitably affixed to opposite sides of the supporting strip. In this form of curtain, the fibrous material 64 is stitched or otherwise located along the curtain strip and is particularly efficient in that the fibrous material will not bridge across irregular body surfaces but rather, conforms closely to said surfaces during passage thereover efficiently cleansing same. One suitable type of material affixed to the curtain strips is that cut from carpeting of a synthetic fiber having a pile depth of approximately 1 inch.

The usefulness of the present apparatus may be extended by providing a second apparatus for removal of water from the washed vehicle. The tubular support structure 1 of the second apparatus would, of course, not include the "wands" or other discharge nozzles. The strips S of synthetic fiber serve to wipe the wet automobile surfaces with the absorbed water rapidly evaporating from the moving strips. The continuous travel of the strips hastens evaporation with known fan assemblies being usable, if necessary, to expedite same.

Brush Assemblies

A modification of the invention is disclosed in FIGS. 14 through 17 which are concerned with the addition of brush assemblies into the car wash apparatus supplementing the cleaning action of the curtain assemblies. The brushes are particularly adapted to clean the vehicle sides and especially the rocker panels of an automobile such being that area of the body below the door openings. Rocker panels are particularly difficult to clean by reason of same being inwardly directed presenting an inclined surface to a washing instrumentality.

Figure 14:
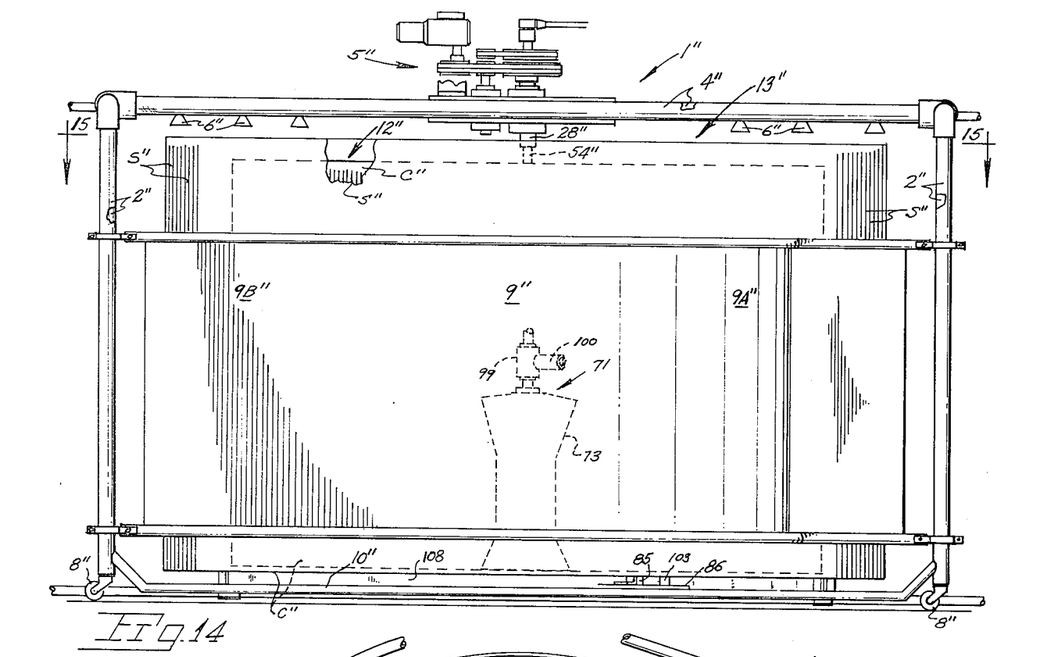
FIG. 14 is a side elevational view of the present apparatus with a rotary side brush shown in dashed lines.

With attention to FIG. 14, the tubular framework of the apparatus remains as earlier disclosed in FIGS. 10, 11 and 12 with framework and curtain assembly components indicated by double prime reference numerals. Brush assemblies are indicated generally at 70 and 71. Each assembly is located to one side of a vehicle path with brushes at 72 and 73 being biased into engagement with the vehicle sides.

Power take-off means generally indicated at 74 and 75 include respectively, pairs of sheaves 76, 77 and 78, 79 in entrainment with a continuous element at 80 in the form of a cable circuit carried by inner curtain support frame 12" and more specifically Z-shaped clips 81 on the spars 15" of the frame. With joint attention to FIGS. 15 and 16, the cable 80 is reversed by travel about the first sheaves 76, 78 of each pair of sheaves and subsequently passes about the second sheaves 77, 79 prior to the cable again re-engaging clips 81 on the inner curtain support frame. Cable 80 is in tensioned engagement with clips 81 but may freely depart from same for travel about the above mentioned sheaves with return to clip engagement during support frame rotation by the prime mover. Applied arrows to the drive sheaves indicate the direction of sheave travel in response to cable passage.

Figure 16:
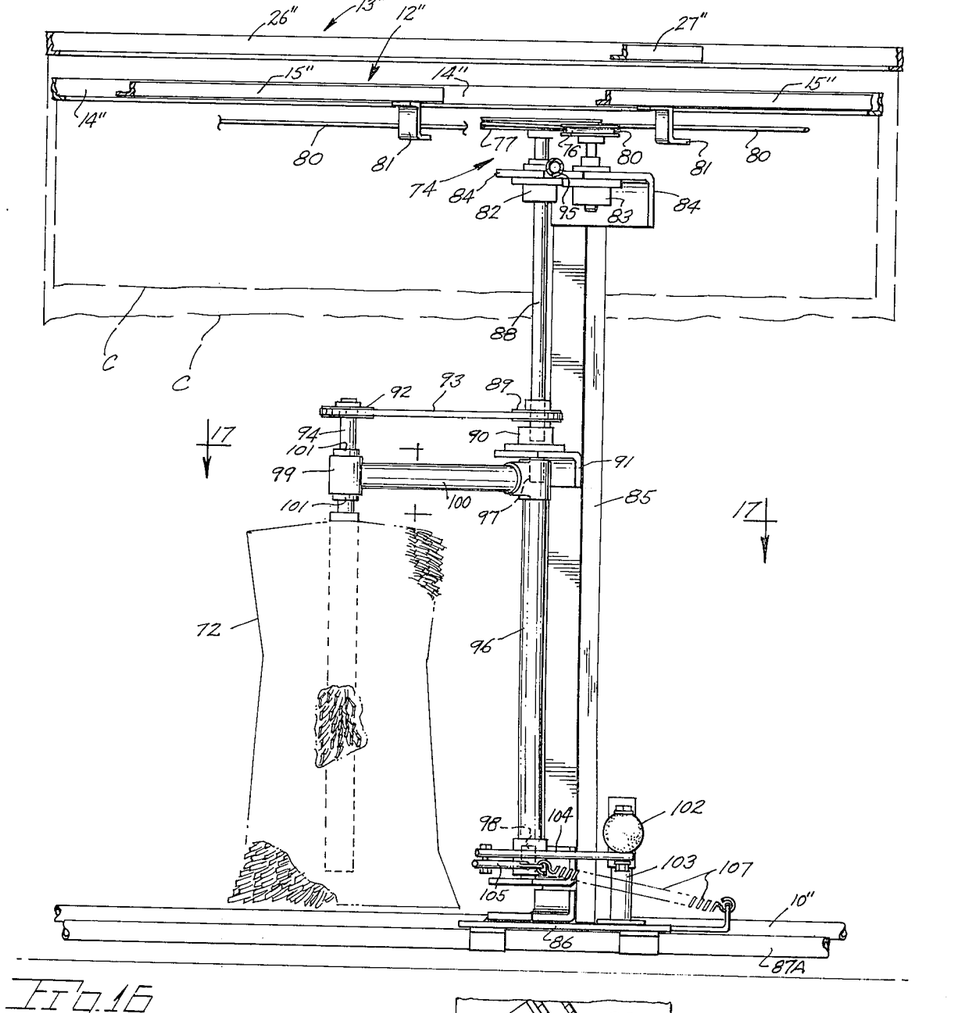
FIG. 16 is an elevational view of a side brush assembly taken along line 16—16 of FIG. 15.

As each brush assembly is substantially the same, the following description of the single brush assembly of FIG. 16 is believed adequate. Both the cable reversing sheave and the power take-off sheave of each power take-off are journalled within bearings 82, 83 mounted on a plate 84 supported by the upper end of a post 85.

A stabilizing bar 95 interconnects plates 84 of the brush assemblies for purposes of rigidity. a base 86 supports post 85 and, in turn, rests upon a pair of longitudinal members 10" and 87A of the car wash apparatus. An inner rail member 87B serves additionally as a guide rail for vehicle wheels. A power take-off shaft 88 is fitted at its lower end with a belt pulley 89 and terminates therebelow in a bearing 90 supported by a flange 91. A pulley at 92 is in driven engagement with the first mentioned pulley 89 by means of V-belt 93 which may be mounted in a figure eight manner for desired brush rotation direction. The last mentioned pulley is mounted on a shaft 94 to which is secured brush 72. Accordingly, rotary motion is imparted to brush 72 about the axis of shaft 94.

Brush support structure includes a post 96 in axial alignment with power take-off shaft 88, the upper and lower ends of the post having end fittings pivotally mounted on pintles 97–98. A brush support arm 100 is fitted at its outer end with a sleeve 99 housing suitable radial thrust bearings 101. The brush structure may move in an arcuate manner about a vertical axis in coaxial alignment with take-off shaft 88 to permit travel of the rotating brush toward and away from the path of the auto.

Figure 17:
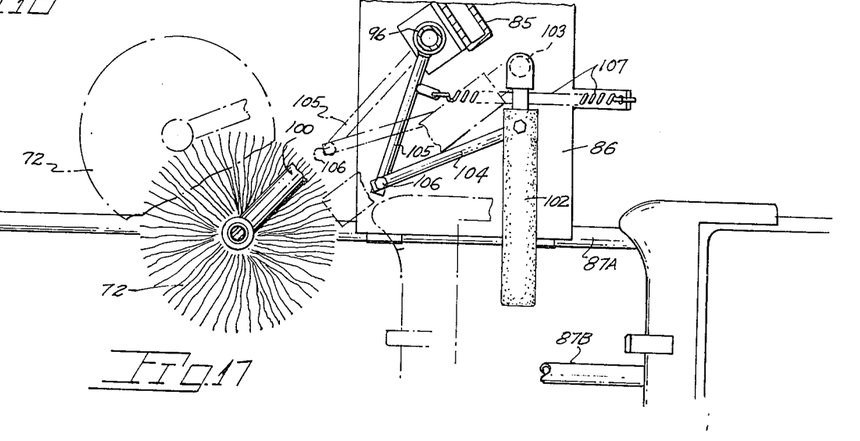
FIG. 17 is a horizontal sectional view of brush positioning linkage taken along line 17—17 of FIG. 16.

With continuing attention to FIG. 16 and also to FIG. 17, a brush control arm 102 projects outwardly into the automobile path for contact with the auto for the purpose of positioning side brush 72 temporarily away from the bumper of an approaching automobile as current bumpers are often of the type having forwardly projecting end portions which could trap or prevent lateral brush travel and hence damage the brush assembly. To remedy this, control arm 102 is swingably mounted for travel about the vertical axis of an arm support 103. To avoid damage to the vehicle finish, the arm is covered with a thickness of resilient material. Linkage at 104 and 105 is pivotally coupled at 106 to translate control arm movement to the brush. Linkage arm 105 is rigidly mounted at its opposite end to an end fitting on brush post 96. Upon contact of the end portion of the auto bumper with arm 102, outward movement is imparted to brush 72 repositioning same temporarily to permit passage of the bumper with subsequent inward return of the brush into cleaning contact with the automobile side. A helical spring 107 urges linkage arm 105 and hence brush 72 into vehicle contact.

The curtains C suspended from the inner and outer curtain rings 14' and 26" are separated during their arcuate travel by curved panels 107, 108 supported at 107A, 108A upon longitudinal members 87A of the support structure. Further, panels 107, 108 serve to guide the passing curtain strips S" of the inner curtain into uniform impingement against the auto body. Panels 107, 108 need only be 2 feet or so in height.

In operation, as the auto progresses through the curtains, the frontal upright surfaces of the auto (FIG. 8) are efficiently cleaned by the combined action of panel guided strips S of the inner and outer curtain assemblies. The travel of the pliable strips is impeded as they come into contact with the surfaces of the auto whereupon they tend to travel over said surfaces in a bunched or grouped manner. The strips under the influence of centrifigual force have a horizontal component of force as they contact the body surfaces.

Figure 8:
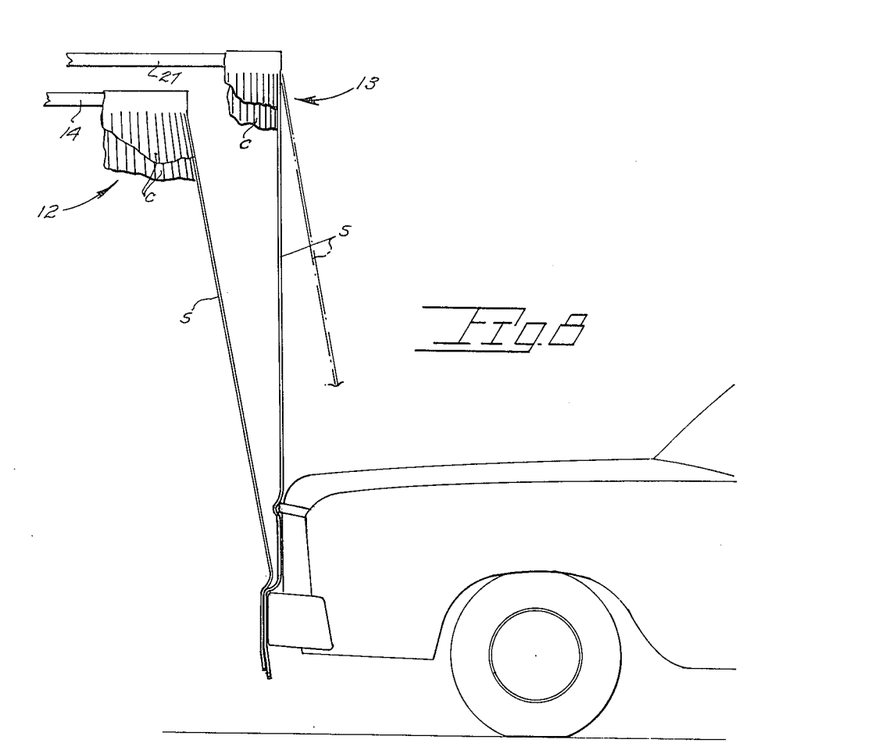
FIG. 8 is a view similar to FIG. 4 showing the relationship of inner and outer curtain strips during impact against leading and trailing upright surfaces of the auto.

Upon advancement of the auto the strips come into contact with the generally horizontal surfaces of the auto with the lower portions of said strips being deflected upwardly towards the horizontal. Strips of the inner curtain assembly 12 accordingly are displaced into the path of oncoming strip portions of outer curtain assembly 13 whereupon the friction of those strips in contact with the auto body is beneficially increased.

While the aforementioned curtain confining means is shown and described as outer panels 9 and inner panels 107, 108 disposed so as to guide the strip-like elements of the curtain assemblies, said confining means may otherwise be embodied as for example within multiple rails vertically spaced to receive and confine impinging curtain elements. Such rails would be mounted to the leg members 2 and longitudinal members 87A of the support structure.

Figure 15:
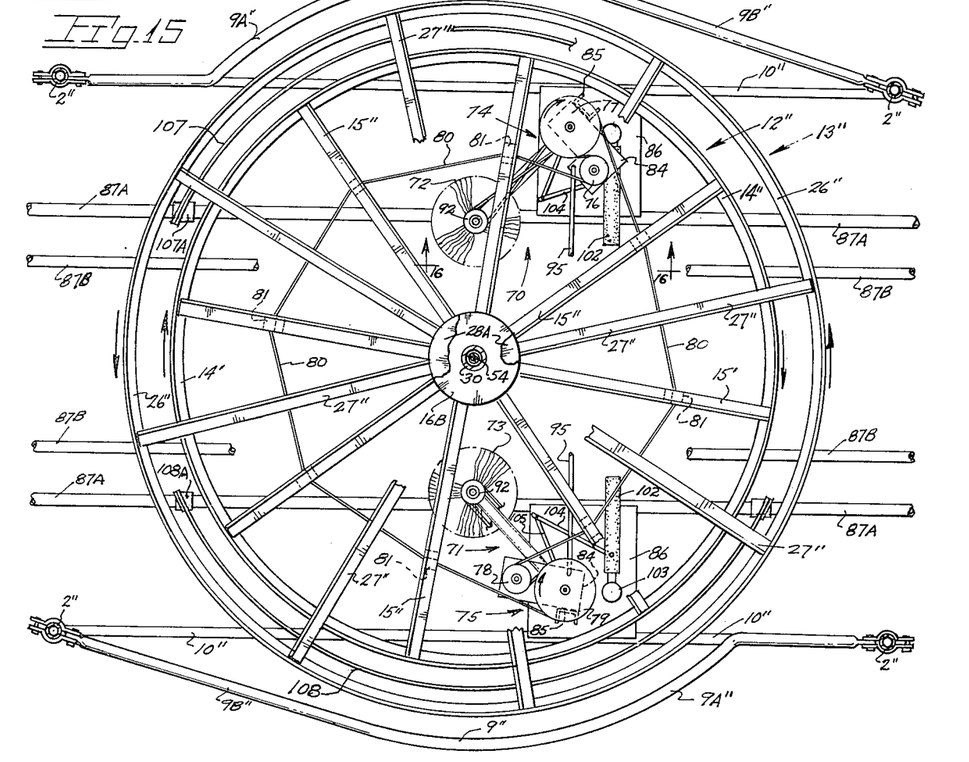
FIG. 15 is a plan view of FIG. 14.

Operation of brush assemblies 70 and 71 commences with rotation being imparted to inner and outer curtain assemblies 12 and 13 by drive mechanism 5. Circular travel of inner curtain ring 14, and hence cable 80 thereon, results in continuous passage of the cable through the sheave arrangement of each brush assembly. Brush rotation by the power take-off drive is in a direction to cause wiping contact of the brush in a direction opposite to vehicle travel. Brush control arm 102 serves to outwardly displace its respective brush to avoid damaging contact with the vehicle bumper while subsequently permitting brush contact with the vehicle side and particularly the rocker panel portion of the vehicle body. The cleaning action of the circular curtains is supplemented which may or may not be required depending upon the dirty condition of the vehicle being washed. The additional loads on motor 37, incurred in powering the brush assemblies, may be considered insignificant as each rotating curtain assembly embodies considerable momentum.

While I have shown a number of embodiments of the invention, it will be apparent to those skilled in the art that the invention may be embodied still otherwise without departing from the spirit and scope of the invention.

Having thus described the invention, what is desired to be secured under a Letters Patent is:

1. An apparatus for use in the washing of vehicles and the like, said apparatus comprising,
   a support structure,
   a drive mechanism including a prime mover on said support structure,
   curtain assemblies supported by said structure with each assembly including a circular curtain support adapted for independent rotational movement about a common axis and from which are suspended curtains of strip-like elements, said strip-like elements of each curtain assembly being in radial spaced relationship to those of the other assembly when the curtain assemblies are at rest, said strip-like elements of one curtain assembly being interengageable with strip-like elements of another curtain assembly upon their displacement resulting from automobile contact, and
   said drive mechanism imparting opposite rotational movement to the curtain supports whereby oppositely moving strip-like elements of each curtain assembly will be trailed across the automobile body in opposite directions with said strip-like elements of the different curtain assemblies randomly engaging each other as they pass in opposite directions to enhance cleaning action of the strips.

2. The apparatus as claimed in claim 1 additionally including curtain confining means associated with said structure and wherein the curtain supports comprise rings of unequal diameter for the purpose of radially offsetting the strip-like elements of one curtain assembly from those of the other.

3. The apparatus as claimed in claim 2 wherein the curtain support of at least one of said curtain assemblies includes conduit means for the application of fluids to the automobile body during its passage beneath said one curtain assembly.

4. The apparatus as claimed in claim 3 wherein said drive mechanism includes concentric drive shafts oppositely driven by the prime mover.

5. The apparatus as claimed in claim 4 wherein the innermost drive shaft is adapted to receive a fluid flow for passage therethrough for delivery of fluid to said conduit means.

6. The apparatus as claimed in claim 5 wherein said curtain assemblies each include a centrally disposed carrier affixed to the lower ends of their respective concentric drive shafts, tensioned members extending inwardly from points spaced about the curtain rings and terminating in attachment with their respective carriers.

7. The apparatus as claimed in claim 6 wherein said tensioned members are attached to their respective carriers in an offset manner, the attachment points being offset forwardly in the direction of curtain assembly rotation for effectively transmitting torque to the curtain rings.

8. The apparatus as claimed in claim 1 additionally including curtain confining means in place adjacent the sides of the support structure and confining the curtain assemblies against excessive centrifugal displacement and to assure optimum impingement of strip-like elements against the vehicle body.

9. The apparatus as claimed in claim 8 wherein said curtain confining means are curvilinear in horizontal section and oppositely spaced from the rotational axis of the curtain assemblies.

10. The apparatus as claimed in claim 9 wherein said curtain confining means include an arcuate portion formed on a constant radius and acting on the strip-like elements of the outer curtain assembly immediately prior to impingement of same against the vehicle body.

11. The apparatus as claimed in claim 8 wherein said curtain confining means includes portions oppositely spaced from the transverse centerline of the apparatus with each portion tangential to the confined path of the outermost curtain elements.

12. The apparatus as claimed in claim 8 wherein the curtain confining means are embodied within upright panels in place on opposite sides of the support structure, said panels being of arcuate configuration for at least a portion of their length.

13. The apparatus as claimed in claim 12 wherein said strips comprise a woven body of material having a pile depth of approximately one inch.

14. The apparatus as claimed in claim 1 wherein the striplike elements of the curtain assemblies include fibrous segments having a thickness greater than the remaining segment of the strip-like elements.

15. An apparatus for washing vehicles and the like, said apparatus comprising,
   a tubular support structure,
   a drive mechanism including a prime mover on said support structure, curtain assemblies of circular configuration supported in a concentric manner by said support structure with each assembly including a curtain support frame adapted for independent rotational movement and from which are suspended curtains of strip-like elements, said strip-like elements of each curtain assembly being in spaced relationship to those of the other assembly when the curtain assemblies are at rest, said strip-like elements of the curtain assemblies being interengageable upon their displacement resulting from automobile contact, brush assemblies within the innermost curtain assembly on opposite sides of a vehicle path, said brush assemblies including power take-off means in driven connection with continuous means carried by the inner curtain support frame permitting brush components to be powered by said rotating inner curtain support frame, and said drive mechanism imparting opposite rotational movement to the curtain support of each curtain assembly whereby oppositely moving strip-like elements of the different curtain assemblies randomly engaging each other as they pass in opposite directions to enhance the cleaning action of the strips.

16. The apparatus as claimed in claim 15 wherein said continuous means is a circuit of cable extending about the curtain support frame in a tensioned manner, said power takeoff means including sheaves about which said cable is entrained.

17. The apparatus as claimed in claim 16 wherein said curtain support frame is provided with a series of clips mounting the cable to said support frame yet permitting excursions of cable segments through said sheaves.

18. The apparatus as claimed in claim 15 wherein said brush assemblies further include brush support structure, an arm contactible with the forward end of the vehicle being washed, linkage actuated by said arm and operable to momentarily reposition the brush support structure outwardly to avoid brush damaging contact with the vehicle bumper.

19. The apparatus as claimed in claim 15 wherein said tubular support structure includes longitudinally extending members supporting the brush assemblies in spaced relationship above a ground surface.

20. In a car wash apparatus having a rotary curtain assembly including a circular support frame from which depends a circular curtain through which a vehicle being cleaned passes, the improvement comprising,
continuous means extending about said support frame, and
a brush assembly within the rotary curtain assembly including power take-off means in driven connection with said continuous means permitting brush components to be powered by the rotating curtain support frame.

21. The improvement as claimed in claim 20 wherein said continuous means comprises a circuit of cable extending about the curtain support frame in a tensioned manner, said power take-off means including sheaves about which said cable is entrained.

22. The improvement as claimed in claim 21 wherein said curtain support frame is provided with a series of clips mounting the cable to said frame while permitting excursions of cable segments through said sheaves.

23. The improvement as claimed in claim 20 wherein said brush assembly includes brush support structure, an arm contactible with the forward end of the vehicle being washed, linkage actuated by said arm and operable to momentarily reposition the brush support structure outwardly to avoid brush damaging contact with the vehicle bumper.

24. In an apparatus for use in the washing of vehicles and the like, said apparatus including curtain assemblies of circular configuration each adapted for opposite rotational movement and each including strip-like elements interengageable with one another during passage over a vehicle body to dislodge dirt particles from same, the improvement embodied within a support structure for said curtains, said support structure including tubular load carrying members, at least some of said load carrying members in communication with a pressurized water source, nozzle means affixed to the last mentioned load carrying members, said last mentioned members defining internal water chambers from which the nozzle means are supplied.

25. The invention as claimed in claim 24 wherein some of said load carrying members include both vertical leg and horizontal members of the support structure with said nozzle means affixed at spaced intervals therealong, said vertical leg and horizontal members in open communication with one another and with said source.

* * * * *